(12) United States Patent
Wang et al.

(10) Patent No.: US 9,436,173 B2
(45) Date of Patent: *Sep. 6, 2016

(54) DRILLING ADVISORY SYSTEMS AND METHODS WITH COMBINED GLOBAL SEARCH AND LOCAL SEARCH METHODS

(75) Inventors: Lei Wang, The Woodlands, TX (US); Stephen M. Remmert, Crossville, TN (US); Paul E. Pastusek, The Woodlands, TX (US); Jeffrey R. Bailey, Houston, TX (US); Matthew T. Prim, Houston, TX (US); Darren Pais, Princeton, NJ (US); Dar-Lon Chang, Sugar Land, TX (US); Gregory S. Payette, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 924 days.

This patent is subject to a terminal disclaimer.

(21) Appl. No.: 13/605,453

(22) Filed: Sep. 6, 2012

(65) Prior Publication Data

US 2013/0066445 A1    Mar. 14, 2013

(51) Int. Cl.
| | |
|---|---|
| *G05B 19/04* | (2006.01) |
| *G05B 13/00* | (2006.01) |
| *E21B 44/00* | (2006.01) |
| *G05B 13/02* | (2006.01) |

(52) U.S. Cl.
CPC ........... *G05B 19/0405* (2013.01); *E21B 44/00* (2013.01); *G05B 13/00* (2013.01); *G05B 13/024* (2013.01)

(58) Field of Classification Search
CPC ................................................ G05B 19/0405

USPC .................................. 700/28, 275; 705/7.23
See application file for complete search history.

(56) References Cited

U.S. PATENT DOCUMENTS

| | | | |
|---|---|---|---|
| 4,507,735 A | 3/1985 | Moorehead et al. |
| 4,736,297 A | 4/1988 | LeJeune |
| 5,216,917 A | 6/1993 | Detournay |
| 5,415,030 A | 5/1995 | Jogi et al. |
| 5,551,286 A | 9/1996 | Booer |
| 5,663,929 A | 9/1997 | Pavone et al. |
| 5,730,234 A | 3/1998 | Putot |
| 5,842,149 A | 11/1998 | Harrell et al. |

(Continued)

FOREIGN PATENT DOCUMENTS

WO    WO 2011/016928 A1    2/2011

OTHER PUBLICATIONS

Cheatham, C.A. et al. (1990), "Bit Balling in Water-Reactive Shale During Full-Scale Drilling Rate Tests, " SPE 19926, 1990 IADC/SPE Drilling Conf., Houston, TX, Feb. 27-Mar. 2, 1990, pp. 169-178.

(Continued)

*Primary Examiner* — Tejal Gami
(74) *Attorney, Agent, or Firm* — ExxonMobil Upstream Research Company—Law Department

(57) ABSTRACT

Combined methods and systems for optimizing drilling related operations include global search engines and local search engines to find the optimal value for at least one controllable drilling parameter, and a data fusion module to combine or select the operational recommendations from global and local search engines. The operational recommendations are used to optimize the objective function, mitigate dysfunctions, and improve drilling efficiency.

18 Claims, 7 Drawing Sheets

(56) References Cited

U.S. PATENT DOCUMENTS

| | | |
|---|---|---|
| 6,021,377 A | 2/2000 | Dubinsky et al. |
| 6,026,912 A | 2/2000 | King et al. |
| 6,155,357 A | 12/2000 | King et al. |
| 6,192,998 B1 | 2/2001 | Pinckard |
| 6,276,465 B1 | 8/2001 | Cooley et al. |
| 6,293,356 B1 | 9/2001 | King et al. |
| 6,382,331 B1 | 5/2002 | Pinckard |
| 6,408,953 B1 | 6/2002 | Goldman et al. |
| 6,424,919 B1 | 7/2002 | Moran et al. |
| 6,443,242 B1 | 9/2002 | Newman et al. |
| 6,480,118 B1 | 11/2002 | Rao |
| 6,662,110 B1 | 12/2003 | Bargach et al. |
| 6,732,052 B2 | 5/2004 | Macdonald et al. |
| 6,820,702 B2 | 11/2004 | Niedermayr et al. |
| 6,892,812 B2 | 5/2005 | Niedermayr et al. |
| 6,968,909 B2 | 11/2005 | Aldred et al. |
| 7,020,597 B2 | 3/2006 | Oliver et al. |
| 7,044,238 B2 | 5/2006 | Hutchinson |
| 7,044,239 B2 | 5/2006 | Pinckard et al. |
| 7,142,986 B2 | 11/2006 | Moran |
| 7,172,037 B2 | 2/2007 | Dashevskiy et al. |
| 7,261,167 B2 | 8/2007 | Goldman et al. |
| 7,274,990 B2 | 9/2007 | Mathiszik et al. |
| 7,316,278 B2 | 1/2008 | Hutchinson |
| 7,357,196 B2 | 4/2008 | Goldman et al. |
| 7,363,988 B2 | 4/2008 | Jeffryes |
| 7,412,331 B2 | 8/2008 | Calhoun et al. |
| 7,606,666 B2 | 10/2009 | Repin et al. |
| 7,610,251 B2 | 10/2009 | Shayegi et al. |
| 7,818,128 B2 | 10/2010 | Zhou et al. |
| 7,857,047 B2 | 12/2010 | Remmert et al. |
| 7,878,268 B2 | 2/2011 | Chapman et al. |
| 7,891,420 B2 | 2/2011 | Dale et al. |
| 7,896,105 B2 | 3/2011 | Dupriest |
| 8,014,987 B2 | 9/2011 | Pabon et al. |
| 2002/0104685 A1 | 8/2002 | Pinckard et al. |
| 2005/0096847 A1 | 5/2005 | Huang |
| 2005/0197777 A1 | 9/2005 | Rodney et al. |
| 2009/0063230 A1* | 3/2009 | Broussard ........ G06Q 10/06313 705/7.23 |
| 2009/0076873 A1 | 3/2009 | Johnson et al. |
| 2009/0089227 A1 | 4/2009 | Sturrock et al. |
| 2009/0090555 A1 | 4/2009 | Boone et al. |
| 2009/0132458 A1 | 5/2009 | Edwards et al. |
| 2010/0108384 A1 | 5/2010 | Byreddy et al. |
| 2010/0121861 A1* | 5/2010 | Marsden ................ G06Q 50/02 707/752 |
| 2011/0232966 A1 | 9/2011 | Kyllingstad |
| 2012/0118637 A1 | 5/2012 | Wang et al. |
| 2012/0123756 A1 | 5/2012 | Wang et al. |
| 2012/0123757 A1 | 5/2012 | Ertas et al. |

OTHER PUBLICATIONS

Gouda, G. M. et al. (2011), "A Real Mathematical Model to Compute the PDC Cutter Wear Value to Terminate PDC Bit Run," SPE 140151, SPE Middle East Oil & Gas Show & Conf., Manama, Bahrain, Sep. 25-28, 2011, 21 pgs.

Ipek, G. et al. (2006), "Diagnosis of Ineffective Drilling Using Cation Exchange Capacity of Shaly Formations," *Journal of Canadian Petroleum Technology* 45(6), pp. 26-30.

Tucker, R.W. et al. (2000), "An Integrated Model for Drill-String Dynamics," Department of Physics, Lancaster University, pp. 1-7, 32-33, 58-64.

Wang, X. et al. (2005), "Process Monitoring Approach Using Fast Moving Window PCA," *Ind. Eng. Chem. Res.* 44, pp. 5691-5702.

Wold, S. (1987), "Principal Component Analysis," *Chemometrics and Intelligent Laboratory Systems* 2, pp. 37-52.

* cited by examiner

DRILLING ADVISORY SYSTEMS AND METHODS WITH COMBINED GLOBAL SEARCH AND LOCAL SEARCH METHODS

CROSS REFERENCE TO RELATED APPLICATIONS

This application claims the benefit of U.S. Provisional Application No. 61/531,926, filed Sep. 7, 2011. This application is also related to and is filed concurrently with U.S. nonprovsional patent application Ser. No. 13/605,467, entitled "Drilling Advisory Systems And Methods With Decision Trees For Learning And Application Modes".

FIELD

The present disclosure relates generally to systems and methods for improving drilling related operations. More particularly, the present disclosure relates to systems and methods that may be implemented in cooperation with hydrocarbon-related drilling operations to improve drilling performance.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, it should be understood that these statements are to be read in this light, and not necessarily as admissions of prior art.

The oil and gas industry incurs substantial operating costs to drill wells in the exploration and development of hydrocarbon resources. The cost of drilling wells may be considered to be a function of time due to the equipment and manpower expenses based on time. The drilling time can be minimized in at least two ways: 1) maximizing the Rate-of-Penetration (ROP) (i.e., the rate at which a drill bit penetrates the earth); and 2) minimizing the non-drilling rig time (e.g., time spent on tripping equipment to replace or repair equipment, constructing the well during drilling, such as to install casing, and/or performing other treatments on the well). Past efforts have attempted to address each of these approaches. For example, drilling equipment is constantly evolving to improve both the longevity of the equipment and the effectiveness of the equipment at promoting a higher ROP. Moreover, various efforts have been made to model and/or control drilling operations to avoid equipment-damaging and/or ROP limiting conditions, such as vibrations, bit-balling, etc.

Many attempts to reduce the costs of drilling operations have focused on increasing the ROP. For example, U.S. Pat. Nos. 6,026,912; 6,293,356; and 6,382,331 each provide models and equations for use in increasing the ROP. In the methods disclosed in these patents, the operator collects data regarding a drilling operation and identifies a single control variable that can be varied to increase the rate of penetration. In most examples, the control variable is Weight On Bit (WOB); the relationship between WOB and ROP is modeled; and the WOB is varied to increase the ROP. While these methods may result in an increased ROP at a given point in time, this specific parametric change may not be in the best interest of the overall drilling performance in all circumstances. For example, bit failure and/or other mechanical problems may result from the increased WOB and/or ROP. While an increased ROP can drill further faster during the active drilling, delays introduced by damaged equipment and equipment trips required to replace and/or repair the equipment can lead to a significantly slower overall drilling performance. Furthermore, other parametric changes, such as a change in the rate of rotation of the drillstring (RPM), may be more advantageous and lead to better drilling performance than simply optimizing along a single variable.

Because drilling performance is measured by more than just the instantaneous ROP, methods such as those discussed in the above-mentioned patents are inherently limited. Other research has shown that drilling rates can be improved by considering the Mechanical Specific Energy (MSE) of the drilling operation and designing a drilling operation that will minimize MSE. For example, U.S. Pat. Nos. 7,857,047, and 7,896,105, each of which is incorporated herein by reference in their entirety for all purposes, disclose methods of calculating and/or monitoring MSE for use in efforts to increase ROP. Specifically, the MSE of the drilling operation over time is used to identify the drilling condition limiting the ROP, often referred to as a "founder limiter". Once the founder limiter has been identified, one or more drilling variables can be changed to overcome the founder limiter and increase the ROP. As one example, the MSE pattern may indicate that bit-balling is limiting the ROP. Various measures may be taken to clear the cuttings from the bit and improve the ROP, either during the ongoing drilling operation or by tripping and changing equipment.

Recently, additional interest has been generated in utilizing artificial neural networks to optimize the drilling operations, for example U.S. Pat. No. 6,732,052, U.S. Pat. No. 7,142,986, and U.S. Pat. No. 7,172,037. However the limitations of neural network based approaches constrain their further applications. For instance, the result accuracy is sensitive to the quality of the training dataset and network structures. Neural network based optimization is limited to local search and has difficulty in processing new or highly variable patterns.

In another example, U.S. Pat. No. 5,842,149 disclosed a close-loop drilling system intended to automatically adjust drilling parameters. However, this system requires a look-up table to provide the relations between ROP and drilling parameters. Therefore, the optimization results depend on the effectiveness of this table and the methods used to generate this data, and consequently, the system may lack adaptability to drilling conditions which are not included in the table. Another limitation is that downhole data is required to perform the optimization.

While these past approaches have provided some improvements to drilling operations, further advances and more adaptable approaches are still needed as hydrocarbon resources are pursued in reservoirs that are harder to reach and as drilling costs continue to increase. Further desired improvements may include expanding the optimization efforts from increasing ROP to optimizing the drilling performance measured by a combination of factors, such as ROP, efficiency, downhole dysfunctions, etc. Additional improvements may include expanding the optimization efforts from iterative control of a single control variable to control of multiple control variables. Moreover, improvements may include developing systems and methods capable of recommending operational changes during ongoing drilling operations.

International patent publications WO2011016927 and WO20110216928 disclosed a data-driven based advisory system. The advisory system uses a PCA (principal component analysis) method to compute the correlations between controllable drilling parameters and an objective function. This objective function can be either single-variable based performance measurement (MSE, ROP, DOC, or bit friction factor mu) or a mathematical combination of MSE, ROP, and other performance variables such as vibration measurement. Since PCA is based on a local search of a subset of the relevant data in a window of interest (the window can be over an interval of formation depth or over time), the searched results may become trapped at local optimum points (sometimes called stationary points). The art needs a method to avoid trapping the search results at or near calculated local operating parameter optimum points.

SUMMARY

The present methods are directed to methods and systems for use in drilling a wellbore, such as a wellbore used in hydrocarbon production related operations. It is desired to have a tool to integrate local search methods such as PCA with global search methods, and then delineate the pros and cons of each or the results of each, to mitigate the issues of trapping search results at local optimum points. Global searches are performed on the entire window or larger window of relevant data than a local search, whereas local searches are performed on subsets of the windowed data.

In one aspect the improvements provided and discussed herein may include a method of drilling a wellbore through subterranean formation, the method comprising: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; using a data fusion method to determine a further optimized recommendation for the at least two controllable drilling parameters based upon the optimized results of the global and local search engines; determining operational updates to at least one of the at least two controllable drilling parameters based at least in part on the further optimized recommendation; and implementing at least one of the determined operational updates in the wellbore drilling operations.

In another aspect the improvements provided and discussed herein may include a computer-based system for use in association with drilling operations, the computer-based system comprising: a processor adapted to execute a programmed set of instructions; a storage medium in communication with the processor; and at least one instruction set accessible by the processor and saved in the storage medium, wherein the at least one instruction set is adapted for: receiving data regarding drilling parameters characterizing ongoing wellbore drilling operations; wherein at least one of the drilling parameters is controllable; utilizing global search engines and/or local search engines to find the optimized values; using a data fusion method to generate recommendations for operational parameters from both global and local search engines; determining operational updates to at least one controllable drilling parameter based at least in part on the generated operational recommendations; and exporting the generated operational updates for ongoing drilling operations; and implementing at least one of the determined operational updates in the drilling operations.

An exemplary method may include: 1) receiving data regarding drilling parameters characterizing wellbore drilling operations; 2) conducting the drilling process to determine a value or values of an objective function or a drilling performance parameter for the controllable drilling parameters in the pattern; 3) identifying a trend in the objective function or drilling performance parameter for this pattern of controllable drilling parameters; 4) using one or more local search engines and one or more global search engines to find the optimized value, separately (i.e. optimal values of the controllable variables) from a moving windowed historical data; 5) performing statistical tests of local and global search engine and/or data fusion optimized value(s) to choose an appropriate data fusion algorithm, which may combine local and global search results, or select the results from a single local or global engine; 6) utilizing a data fusion algorithm combining the results from local search and global search engines to generate operational recommendations for one, two, or more controllable drilling parameters, wherein the operational recommendations are selected to optimize the objective function or the drilling performance measurement, respectively; 7) determining operational updates to at least one controllable drilling parameter based at least in part on the generated operational recommendations; and 8) implementing at least one of the determined operational updates in the ongoing drilling operations.

As a specific example, consider the scenario where WOB, RPM and MSE data are collected every 5 seconds over the course of a given drilling operation. The collected data is used to populate a windowed parameter space, where a given element in the space is defined as a measured WOB, RPM and MSE for a given instance in time within the ranges of WOB, RPM, MSE, and time defined for the window. By definition, the parameter space contains data or measurements associated with a prescribed moving window which, in this particular example, we take as the immediate previous 60 minutes of drilling. The parameter space is therefore continuously updated to account for new data points entering and old data points leaving the 60 minute moving window. Upon repopulation of the parameter space, a global search engine and a local search engine produce optimization results separately, and statistical tests are run on these results, such as a minimum correlation coefficient of 0.25, for example, between the WOB and MSE of the windowed dataset. If the statistical tests are passed, a data fusion algorithm is invoked to combine the global and local search engine results. Failure to reach a certain statistical test on the quality of the data typically means that more data needs to be acquired in a learning mode prior to making recommendations in an application mode.

The statistical quality is evaluated and provided in an understandable way to the driller along with the recommended parameter values. The present disclosure is further directed to computer-based systems for use in association with drilling operations. Exemplary computer-based systems may include: 1) a processor adapted to execute instructions; 2) a storage medium in communication with the processor; and 3) at least one instruction set accessible by the processor and saved in the storage medium. The at least one instruction set is adapted to perform the methods described herein. For example, the instruction set may be adapted to: 1) receive data regarding drilling parameters characterizing ongoing wellbore drilling operations; 2) run local search and global search engines to compute the optimized values for the controllable parameters, respectively; 3) perform statistical tests of the search engine and/or data fusion results to choose an appropriate data fusion algorithm; 4) generate operational recommendations for the one or more controllable drilling parameters, wherein the recommendations are obtained by a data fusion algorithm based on the results from local search and the global search engines (the algorithm may combine local and global search results, or select from multiple local or global results); and 5) export the generated operational recommendations for consideration in controlling ongoing drilling operations.

The present disclosure is also directed to drilling rigs and other drilling equipment adapted to perform the methods described herein. For example, the present disclosure is directed to a drilling rig system comprising: 1) a communication system adapted to receive data regarding at least two drilling parameters relevant to ongoing wellbore drilling operations; 2) a computer-based system according to the description herein, such as one adapted to perform the methods described herein; and 3) an output system adapted to communicate the generated operational recommendations for consideration in controlling drilling operations. The drilling equipment may further include a control system adapted to determine operational updates based at least in part on the generated operational recommendations and to implement at least one of the determined operational updates during the drilling operation. The control system may be adapted to implement at least one of the determined operational updates at least substantially automatically.

BRIEF DESCRIPTION OF THE DRAWINGS

The foregoing and other advantages of the present technique may become apparent upon reading the following detailed description and upon reference to the following drawings.

DETAILED DESCRIPTION

Figure 1:
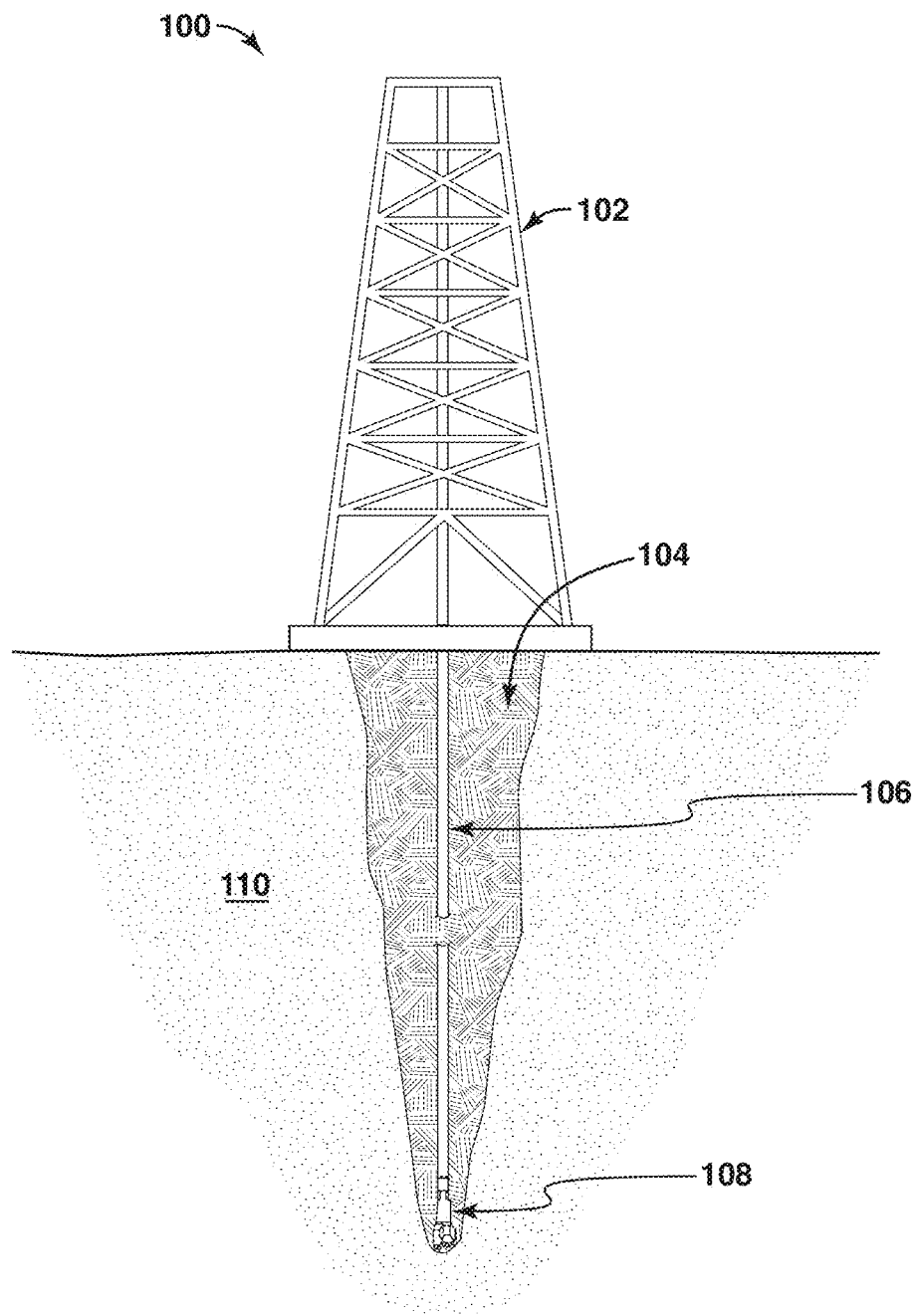
FIG. 1 is simplified schematic view of a well showing the environment in which the present systems and methods may be implemented.

In the following detailed description, specific aspects and features of the present improvements are described in connection with several embodiments. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspects and features may be found and/or implemented with other embodiments of the present invention where appropriate. Accordingly, the invention is not limited to the specific embodiments described below. But rather, the invention includes all alternatives, modifications, and equivalents falling within the scope of the appended claims.

An exemplary method may include steps such as: 1) receiving data regarding drilling parameters wherein one, two, or more of the drilling parameters are controllable; 2) utilizing a statistical model to identify one, two, or more controllable drilling parameters having significant correlation to either an objective function incorporating two or more drilling performance measurements or some other drilling performance measurement; 3) generating operational recommendations for one, two, or more controllable drilling parameters, wherein the operational recommendations are selected to optimize the objective function or the drilling performance measurement, respectively; 4) determining operational updates to at least one controllable drilling parameter based at least in part on the generated operational recommendations; and 5) implementing at least one of the determined operational updates in the ongoing drilling operations. These inventive methods and systems may be further improved by implementing the additional methods and systems disclosed herein which are designed to facilitate field operations to render a drilling advisory system that may be readily reduced to practice.

In this regard, there are several operational aspects to consider. First, when the bit touches the formation at the initiation of the drilling process, the driller should have a planned set of operating conditions that comprises a drilling operation sequence. This set of conditions is called a "grid" with grid points corresponding to each combination of operating parameters, including but not limited to WOB, RPM, flow rate, and pump strokes per minute. These operating parameters are considered independent variables whereas measurements or objective functions such as MSE, ROP, DOC, and bit coefficient of friction (mu) are considered dependent variables. Objective functions may also include mathematical combinations of commonly used functions such as MSE, ROP, DOC, and mu. Secondly, the driller also needs to know in advance the operational steps to utilize the system when changes in the drilling environment are observed. The system needs to be able to update its results as rapidly as the driller would do in the absence of such a system or method, otherwise the system may be deemed partially or wholly ineffective. Third, the drilling environment is known to change with time and depth for various and sundry reasons known to those in the art, and the drilling advisory systems and methods should periodically probe the operating parameter space to discern such changes. When there is insufficient data to provide statistically valid parameters for optimizing drilling performance over the operating parameter space, the data fusion algorithm could be altered to make parameter recommendations for the purpose of obtaining additional data. The systems and methods discussed herein, comprising combinations of grid search methods with statistical methods, are designed to provide drilling parameter recommendations in a robust manner to either optimize drilling performance or obtain sufficient data to establish statistical validity of the search or data fusion results. At the same time, these improvements will also provide the capability for rapid adjustment to changes in the drilling environment as the drilling progresses. This disclosure teaches enhancements to these systems and methods to satisfy one or more of the improvement needs within the art.

FIG. 1 illustrates a side view of a relatively generic drilling operation at a drill site 100. FIG. 1 is provided primarily to illustrate the context in which the present systems and methods may be used. As illustrated, the drill site 100 is a land based drill site having a drilling rig 102 disposed above a well 104. The drilling rig 102 includes a drillstring 106 including a drill bit 108 disposed at the end thereof. The apparatus illustrated in FIG. 1 are shown in almost schematic form to show the representative nature thereof. The present systems and methods may be used in connection with any currently available drilling equipment and is expected to be usable with any future developed drilling equipment. Similarly, the present systems and methods are not limited to land based drilling sites but may be used in connection with offshore, deepwater, arctic, and the other various environments in which drilling operations are conducted.

While the present systems and methods may be used in connection with any drilling operation, they are expected to be used primarily in drilling operations related to the recovery of hydrocarbons, such as oil and gas. Additionally, it is noted here that references to drilling operations are intended to be understood expansively. Operators are able to remove rock from a formation using a variety of apparatus and methods, some of which are different from conventional forward drilling into virgin formation. For example, reaming operations, in a variety of implementations, also remove rock from the formation. Accordingly, the discussion herein referring to drilling parameters, drilling performance measurements, etc., refers to parameters, measurements, and performance during any of the variety of operations that cut rock away from the formation. As is well known in the drilling industry, a number of factors affect the efficiency of drilling operations, including factors within the operators' control and factors that are beyond the operators' control. For the purposes of this application, the term drilling conditions will be used to refer generally to the conditions in the wellbore during the drilling operation. The drilling conditions are comprised of a variety of drilling parameters, some of which relate to the environment of the wellbore and/or formation and others that relate to the drilling activity itself. For example, drilling parameters may include rotary speed (RPM), WOB, characteristics of the drill bit and drillstring, mud weight, mud flow rate, lithology of the formation, pore pressure of the formation, torque, pressure, temperature, ROP, MSE, vibration measurements, etc. As can be understood from the list above, some of the drilling parameters are controllable and others are not. Similarly, some may be directly measured and others must be calculated based on one or more other measured parameters.

As drilling operations progress, the drill bit 108 advances through the formation 110 at a rate known as the rate of penetration (108), which is commonly calculated as the measured depth drilled over time. As the formation conditions depend on location, depth, and even time, the drilling conditions necessarily change over time within a given wellbore. Moreover, the drilling conditions may change in manners that dramatically reduce the efficiencies of the drilling operation and/or that create less preferred operating conditions. Accordingly, research is continually seeking improved methods of predicting and detecting changes in drilling conditions. As described in the Background above, the past research has focused on local search based optimization schemes such as neural networks or statistical methods. Since the searched results may be trapped at local optimum points (also called stationary points), these algorithms may not always provide the best solution. On the other hand, some empirical methods also have been used to find the "best" drilling parameters within a data window but cannot determine which direction to change a parameter to find a new set of optimized parameters better than the past parameters. The present systems and methods provide at least one improvement over these paradigms.

Figure 2:
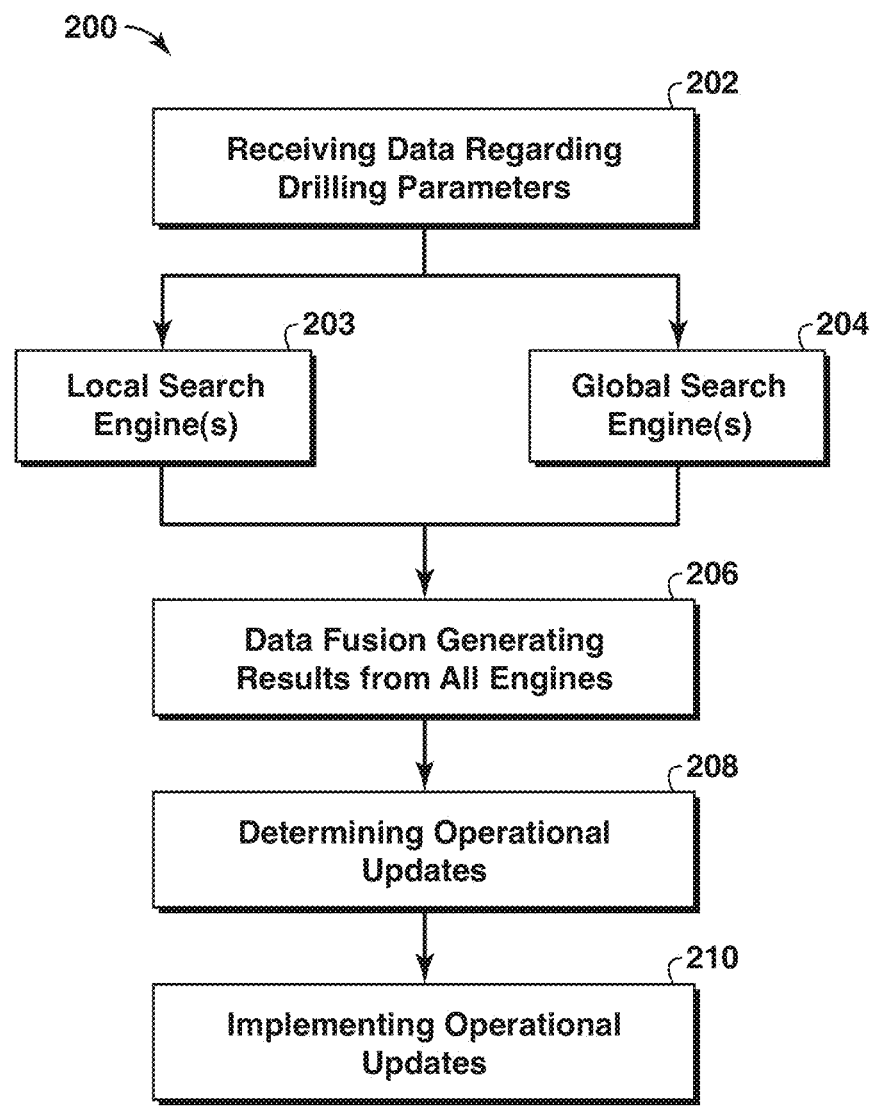
FIG. 2 is an exemplary flow chart of methods for updating operational parameters to optimize drilling operations.

As illustrated in FIG. 2, the present invention includes methods of drilling a wellbore 200. FIG. 2 provides an overview of the methods disclosed herein, which will be expanded upon below. In its most simple explanation, the present methods of drilling include: 1) receiving data regarding ongoing drilling operations, specifically data regarding drilling parameters that characterize the drilling operations, at 202; 2) executing local search engine(s) 203 and global search engine(s) 204 in serial and/or parallel mode; 3) generating operational recommendations to optimize drilling performance based on a data fusion method that is used to combine the results of global and local search engines, at 206; 4) determining operational updates, at 208; and 5) implementing the operational updates, at 210.

The step 202 of receiving data regarding ongoing drilling operations includes receiving data regarding drilling parameters that characterize the ongoing drilling operations. At least one of the drilling parameters received is a controllable drilling parameter, such as RPM, WOB, and mud flow rate. It is to be understood that "receiving drilling parameters" includes all of the means of deriving information about a process parameter. For example, considering the WOB or RPM, the system may record the parameter setpoint provided by the driller using the drilling system controls (or using an automated system to accomplish same), the value may be measured by one or more instruments attached to the equipment, or the data may be processed to achieve a derived or inferred parameter value. For systems that return the measured values of parameters, such as WOB or RPM, the setpoint values may be calculated or inferred from the values recorded by the instrument. In this context, all of these inclusively refer to the "received drilling parameters." The data may be received in any suitable manner using equipment that is currently available or future developed technology. Similarly, the data regarding drilling parameters may come from any suitable source. For example, data regarding some drilling parameters may be appropriately collected from surface instruments while other data may be more appropriately collected from downhole measurement devices.

As one more specific example, data may be received regarding the drill bit rotation rate, an exemplary drilling parameter, either from the surface equipment or from downhole equipment, or from both surface and downhole equipment. The surface equipment may either provide a controlled rotation rate (setpoint, gain, etc.) as an input to the drilling equipment or a measured torque and RPM data, from which downhole bit rate may be estimated. The downhole bit rotation rate can also be measured and/or calculated using one or more downhole tools. Any suitable technology may be used in cooperation with the present systems and methods to provide data regarding any suitable assortment of drilling parameters, provided that the drilling parameters are related to and can be used to characterize ongoing drilling operations and provided that at least one of the drilling parameters is directly or indirectly controllable by an operator.

Combined Methods

As indicated above, the methods include, at 203, local search engine(s) that utilize a statistical model to identify at least one controllable drilling parameter having significant correlation to an objective function, or one or more objective functions, incorporating two or more drilling performance measurements, such as ROP, MSE, vibration measurements, etc., and mathematical combinations thereof. In some implementations, two or more statistical models may be used in cooperation, synchronously, iteratively, or in other arrangements to identify the significantly correlated and controllable drilling parameters. In some implementations, the statistical model may be utilized in substantially real-time utilizing the received data. Exemplary local search engines may include gradient ascent search, PCA (principal component analysis), Powell's method, etc. The methods also include, at 204, global search engine(s) to construct the response surface of the selected objective function with respect to controllable drilling parameters in a 3-D surface or a hyperplane in N-dimensional space, by any regression or interpolation methods, and to find an optimal point from the response surface. Note that the local and global engines 203 and 204 may be running in serial and/or parallel mode. Furthermore, the method of combining the search results may change with time and operator input and with changes in the drilling parameter values.

In general terms, global and local engines search in a hyperdimensional space consisting of one or more drilling parameters and at least one objective function, which incorporates two or more drilling performance measurements and determines the degree of correlation between the objective function and the drilling parameters. By way of example, the objective function may be a single variable of ROP, MSE, Depth of Cut (DOC), bit friction factor mu, and/or mathematical combinations thereof. The objective function may also be a function of ROP, MSE, DOC, mu, weight on bit, drill string parameters, bit rotation rate, torque applied to the drillstring, torque applied to the bit, vibration measurements, hydraulic horsepower (e.g., mud flow rate, viscosity, pressure, etc.) etc., and mathematical combinations thereof. Additional details and examples of utilizing the search engines to identify optimal drilling parameters are provided below.

Basically, the local and global search engines generate recommendations separately for the controllable drilling parameters in serial and/or parallel mode. Then at 206, a method is used to fuse the recommendations from the two engines or select between the two engines. The embodiments of the data fusion method may include using weighted averaging, power-law averaging, Murphy's averaging, fuzzy logic, Dempster-Shafer (D-S) Evidence, Kalman filter, and Bayesian networks. Compared to the traditional drilling optimization methods, such as statistical methods or neural networks, the main benefit of the combined method is that it can be used under a wide variety of operating conditions. A global search provides some measure of protection against getting stuck in a local optimum, since it is capable of spanning the entire operating parameter space. A local search engine is then well-suited to searching with smaller step sizes to optimize the objective function in a local sense. Note that the global search results may be obtained over the same or longer time or depth interval than the local search engine.

In some implementations, the recommendations may provide qualitative recommendations, such as increase, decrease, or maintain a given drilling parameter (e.g., weight on bit, rotation rate, etc.), or the recommendation might be to pick up off bottom. Additionally or alternatively, the recommendations may provide quantitative recommendations, such as to increase a drilling parameter by a particular measure or percentage or to decrease a drilling parameter to a particular value or range of values. In some implementations, the operational recommendations may be subject to boundary limits, such as maximum rate of rotation, minimum acceptable mud flow rate, top-drive torque limits, maximum duration of a specified level of vibrations, etc., that represent either physical equipment limits or limits derived by consideration of other operational aspects of the drilling process. For example, there may be a minimum acceptable mud flow rate to transport drill cuttings to the surface and/or a maximum acceptable rate above which the equivalent circulating density becomes too high.

Continuing with the discussion of FIG. 2, the step of determining operational updates, at 208, includes determining operational updates to at least one controllable drilling parameter, which determined operational updates are based at least in part on the generated operational recommendations. Similar to the generation of operational recommendations and as will be discussed in greater detail below, the determined operational update for a given drilling parameter may include directional updates and/or quantified updates. For example, the determined operational update for a given drilling parameter may be selected from increase/decrease/maintain/pickup commands or may quantify the degree to which the drilling parameter should be changed, such as increasing or decreasing the weight on bit by X and increasing or decreasing the rotation rate by Y.

The step of determining operational updates may be performed by one or more operators (i.e., individuals at the rig site or in communication with the drilling operation) and computer-based systems. For example, drilling equipment is being more and more automated and some implementations may be adapted to consider the operational recommendations alone or together with other data or information and determine operational updates to one or more drilling parameters. Additionally or alternatively, the drilling equipment and computer-based systems associated with the present methods may be adapted to present the operational recommendations to a user, such as an operator, who determines the operational updates based at least in part on the operational recommendations. The user may determine the operational updates based at least in part on the operational recommendations using "hog laws" or other experienced based methods and/or by using computer-based systems.

Finally, the step of implementing at least one of the determined operational updates in the ongoing drilling operation, at 210, may include modifying and/or maintaining at least one aspect of the ongoing drilling operations based at least in part on the determined operational updates. In some implementations, such as when the operational updates are determined by computer-based systems from the operational recommendations, the implementation of the operational updates may be automated to occur without user intervention or approval. Additionally or alternatively, the operational updates determined by a computer-based system may be presented to a user for consideration and approval before implementation. For example, the user may be presented with a visual display of the proposed determined operational updates, which the user can accept in whole or in part without substantial steps between the presentation and the implementation. For example, the proposed updates may be presented with 'accept' and 'change' command buttons or controls and with 'accept all' functionality. In such implementations, the implementation of the determined operational updates may be understood to be substantially automatic as the user is not required to perform calculations or modeling to determine the operational update or to perform several manual steps to effect the implementation. Additionally or alternatively, the implementation of the determined operational updates may be effected by a user after a user or other operator has considered the operational recommendations and determined the operational updates.

While specific examples of implementations within the scope of the above described method and within the scope of the claims are described below, it is believed that the description provided above and in connection with FIG. 2 illustrates at least one improvement over the paradigms of the previous efforts. Specifically, it consists of global and local search engines calculating recommended parameters, and then it uses a data fusion module to combine the recommendations from multiple search engines. This new approach can mitigate the issue that recommendation results may be trapped at a local minimum point of the response surface. This is a common issue for many local search based optimization methods such as neural networks and gradient search methods. Typically, the inclusion of a global search method also provides a search over a wider parameter set than a local search method. Compared to some common empirical optimization methods, this new approach also offers more adaptability to the input data stream.

Although reference herein is to using a global and a local search engine, more generally the data fusion method could use more than one search engine of each type. The data fusion algorithm would then be adjusted to combine the results in such a way as to provide the most optimum results based on some measure of drilling criteria, statistical significance, or a combination of the drilling and statistical methods.

Figure 3:
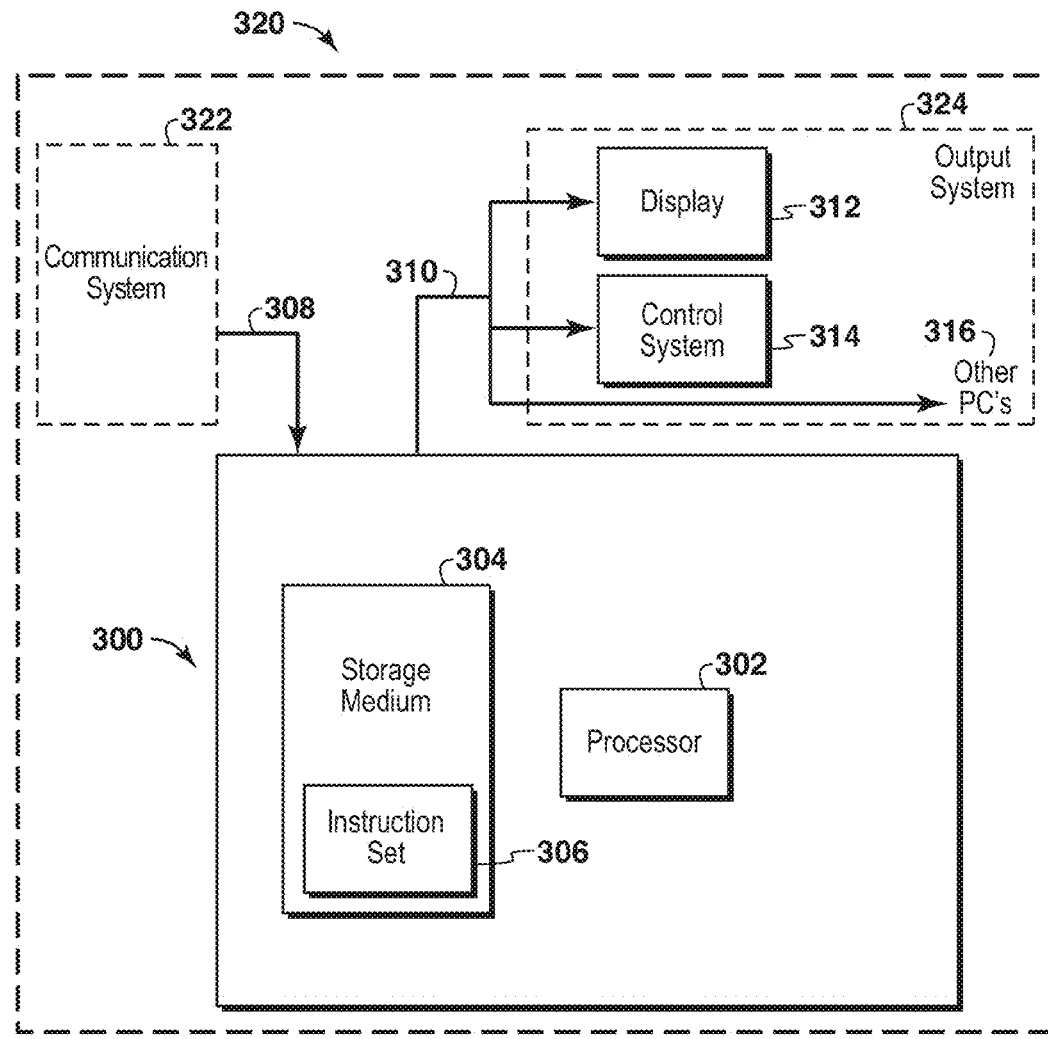
FIG. 3 is a schematic view of systems within the scope of the present invention.

FIG. 3 schematically illustrates systems within the scope of the present invention. In some implementations, the systems comprise a computer-based system 300 for use in association with drilling operations. The computer-based system may be a computer system, may be a network-based computing system, and/or may be a computer integrated into equipment at the drilling site. The computer-based system 300 comprises a processor 302, a storage medium 304, and at least one instruction set 306. The processor 302 is adapted to execute instructions and may include one or more processors now known or future developed that is commonly used in computing systems. The storage medium 304 is adapted to communicate with the processor 302 and to store data and other information, including the at least one instruction set 306. The storage medium 304 may include various forms of electronic storage mediums, including one or more storage mediums in communication in any suitable manner. The selection of appropriate processor(s) and storage medium(s) and their relationship to each other may be dependent on the particular implementation. For example, some implementations may utilize multiple processors and an instruction set adapted to utilize the multiple processors so as to increase the speed of the computing steps. Additionally or alternatively, some implementations may be based on a sufficient quantity or diversity of data that multiple storage mediums are desired or storage mediums of particular configurations are desired. Still additionally or alternatively, one or more of the components of the computer-based system may be located remotely from the other components and be connected via any suitable electronic communications system. For example, some implementations of the present systems and methods may refer to historical data from other wells, which may be obtained in some implementations from a centralized server connected via networking technology. One of ordinary skill in the art will be able to select and configure the basic computing components to form the computer-based system.

Importantly, the computer-based system 300 of FIG. 3 is more than a processor 302 and a storage medium 304. The computer-based system 300 of the present disclosure further includes at least one instruction set 306 accessible by the processor and saved in the storage medium. The at least one instruction set 306 is adapted to perform the methods of FIG. 2 as described above and/or as described below. As illustrated, the computer-based system 300 receives data at data input 308 and exports data at data export 310. The data input and output ports can be serial port (DB-9 RS232), LAN or wireless network, etc. The at least one instruction set 306 is adapted to export the generated operational recommendations for consideration in controlling drilling operations. In some implementations, the generated operational recommendations may be exported to a display 312 for consideration by a user, such as a driller. In other implementations, the generated operational recommendations may be provided as an audible signal, such as up or down chimes of different characteristics to signal a recommended increase or decrease of WOB, RPM, or some other drilling parameter. In a modern drilling system, the driller is tasked with monitoring of onscreen indicators, and audible indicators, alone or in conjunction with visual representations, may be an effective method to convey the generated recommendations. The audible indicators may be provided in any suitable format, including chimes, bells, tones, verbalized commands, etc. Verbal commands, such as by computer generated voices, are readily implemented using modern technologies and may be an effective way of ensuring that the right message is heard by the driller. Additionally or alternatively, the generated operational recommendations may be exported to a control system 314 adapted to determine at least one operational update. The control system 314 may be integrated into the computer-based system or may be a separate component. Additionally or alternatively, the control system 314 may be adapted to implement at least one of the determined updates during the drilling operation, automatically, substantially automatically, or upon user activation.

Continuing with the discussion of FIG. 3, some implementations of the present technologies may include drilling rig systems or components of the drilling rig system. For example, the present systems may include a drilling rig system 320 that includes the computer-based system 300 described herein. The drilling rig system 320 of the present disclosure may include a communication system 322 and an output system 324. The communication system 322 may be adapted to receive data regarding at least two drilling parameters relevant to ongoing drilling operations. The output system 324 may be adapted to communicate the generated operational recommendations and/or the determined operational updates for consideration in controlling drilling operations. The communication system 322 may receive data from other parts of an oil field, from the rig and/or wellbore, and/or from another networked data source, such as the Internet. The output system 324 may be adapted to include displays 312, printers, control systems 314, other computers 316, network at the rig site, or other means of exporting the generated operational recommendations and/or the determined operational updates. The other computers 316 may be located at the rig or in remote offices. In some implementations, the control system 314 may be adapted to implement at least one of the determined operational updates at least substantially automatically. As described above, the present methods and systems may be implemented in any variety of drilling operations. Accordingly, drilling rig systems adapted to implement the methods described herein to optimize drilling performance are within the scope of the present invention. For example, various steps of the presently disclosed methods may be done utilizing computer-based systems and algorithms and the results of the presently disclosed methods may be presented to a user for consideration via one or more visual displays, such as monitors, printers, etc., or via audible prompts, as described above. Accordingly, drilling equipment including or communicating with computer-based systems adapted to perform the presently described methods are within the scope of the present invention.

Objective Functions

As described above in connection with FIG. 2, the present systems and methods optimize an objective function incorporating two or more drilling performance measurements by determining relationships between one or more controllable drilling parameters and the objective function (or, more precisely, the mathematical combination of the two or more drilling performance measurements). In some implementations, the two or more drilling performance measurements may be embodied in one or more objective functions adapted to describe or model the performance measurement in terms of at least two controllable drilling parameters. As described herein, relating the objective function to at least two controllable drilling parameters may provide additional benefits in the pursuit of an optimized drilling operation. As shown in equation (1), an objective function can be solely based on ROP, MSE, or DOC and is referenced at times herein to illustrate one or more of the differences between the present systems and methods and the conventional methods that merely seek to maximize ROP. Exemplary objective functions within the scope of the present invention are shown in equations (2) and (3). As shown, the objective function may be a function of two or more drilling performance measurements (e.g., ROP and/or MSE) and/or may be a function of controllable and measurable parameters. It is understood that the drilling parameters to be included in the objective functions include the setpoint values, measured values, or processed measured values to derive or infer setpoint values.

$$OBJ = ROP \quad (1.1)$$

$$OBJ = -MSE, \text{ OR } OBJ = 1/MSE \quad (1.2)$$

$$OBJ = DOC = k\frac{ROP}{RPM} \quad (1.3)$$

where k is a unit factor. k=1/5 for DOC in inches/revolution, ROP in feet/hour, and RPM in revolution/minutes. k=16.67 for DOC in millimeters/revolution, ROP in meters/hour, and RPM in revolution/minutes.

$$OBJ = \frac{\delta + ROP/ROP_o}{\delta + MSE/MSE_o}, (\delta \text{ factor to be determined}) \quad (2)$$

$$OBJ = \frac{\delta + \Delta ROP/ROP}{\delta + \Delta MSE/MSE}.(\delta \text{ factor to be determined}) \quad (3)$$

The objective function of equation (2) is to maximize the ratio of ROP-to-MSE (simultaneously maximizing ROP and minimizing MSE); the objective function of equation (3) is to maximize the ROP percentage increase per unit percentage increase in MSE where ΔROP and ΔMSE are changes of ROP and MSE, respectively, from a first data point to a second data point. These objective functions can be used for different scenarios depending on the specific objective of the drilling operation. Note that equations (2) and (3) require a factor δ to avoid a singularity. Other formulations of the objective function OBJ(MSE,ROP) may be devised within the scope of the invention to avoid a possible divide-by-zero singularity. In equation (2), the nominal $ROP_o$ and $MSE_o$ are used to provide dimensionless values to account for varying formation drillability conditions. Such reference values may be specified by a user or determined from the data, such as, for example, using a moving average value.

It is also important to point out that the methodology and algorithms presented in this invention are not limited to these three types of objective functions. They are applicable to and cover any form of objective function adapted to describe a relationship between drilling parameters and drilling performance measurement. For example, it is observed that MSE is sometimes not sensitive to downhole torsional vibrations such as stick-slip events which may generate large oscillations in the rotary speed of a drillstring. Basically, there are two approaches to take the downhole stick-slip into account. One is to display the stick-slip severity as a surveillance indicator but still use the MSE-based objective functions as shown in equations (2) or (3) to optimize drilling performance. It is well-known that one means to mitigate stick-slip is to increase the surface RPM and/or reduce WOB. To optimize the objective function and reduce the stick-slip at the same time, the operational recommendation created from the model should be selected as the one that is compatible with the stick-slip mitigation. Another approach is to integrate the stick-slip severity (SS) into the objective functions, and equations (2)-(3) can be modified as $$OBJ(MSE, SS, ROP) = \frac{\delta + ROP/ROP_o}{\delta + MSE/MSE_o + SS/SS_o}, \quad (4)$$

(δ factor to be determined), $$OBJ(MSE, SS, ROP) = \frac{\delta + \Delta ROP/ROP}{\delta + \Delta MSE/MSE + \Delta SS/SS}. \quad (5)$$

(δ factor to be determined)

where a nominal $SS_0$ is used to provide dimensionless values. The said stick-slip severity for both approaches can be either real-time stick-slip measurements transmitted from a downhole vibration measurement tool or a model prediction calculated from the surface torque and the drillstring parameters. The stick-slip severity, SS, may be also used directly as an objective function $$OBJ=-SS, \text{ OR } OBJ=1/SS$$

Besides stick-slip surveillance while drilling, the other benefit of this objective function is to enable operational recommendations for off-bottom rotation. When the drillstring rotates off bottom, the bit is not engaged with the formation (ROP=0, so MSE becomes infinite) and none of the other objective functions are applicable. Note that, as illustrated in this example, the objective function itself may change in time.

While the above objective functions are written somewhat generically, it should be understood that each of the drilling performance measurements may be related to multiple drilling parameters. For example, a representative equation for the calculation of MSE is provided in equation (6):

$$MSE = \frac{(Torque \cdot RPM + ROP \cdot WOB)}{HoleArea \cdot ROP}. \quad (6)$$

Accordingly, when optimizing the objective function, multiple drilling parameters may be optimized simultaneously, which, in some implementations, may provide the generated operational recommendations. The constituent parameters of MSE shown in equation (6) suggest that alternative means to describe the objective functions in equations (1)-(5) may include various combinations of the independent parameters WOB, RPM, ROP, and Torque. Additionally, one or more objective functions may combine two or more of these parameters in various suitable manners, each of which is to be considered within the scope of the invention.

Local Search Methods

As described above, prior local search methods attempted to correlate a single control variable to a single measure of drilling performance (i.e., the rate of penetration) and to increase ROP by iteratively and sequentially adjusting the identified single control variable. The local search methods of the present systems and methods are believed to improve upon that paradigm by correlating control variables to two or more drilling performance measurements. At least some of the benefits available from such correlations are described herein; others may become apparent through continued implementation of the present systems and methods.

Additionally, some implementations of the present systems and methods may be adapted to correlate at least two drilling parameters with an objective function incorporating two or more drilling performance measurements. By correlating more than one drilling parameter to the objective function, multiple drilling parameters can be optimized simultaneously. As can be seen in the expressions below, changing or optimizing parameters simultaneously can lead to a different outcome compared to changing them sequentially. Any objective function OBJ can be expressed as a function (or relationship) of multiple drilling parameters; the expression of equation (7) utilizes two parameters for ease of illustration.

$$OBJ = f(x,y) \quad (7)$$

At any time during the drilling process, determined operational updates produced by the present methods can be expressed as in equation (8).

$$\Delta OBJ = \frac{\partial f}{\partial x}\bigg|_{x_{t_0}, y_{t_0}} \cdot \Delta x + \frac{\partial f}{\partial y}\bigg|_{x_{t_0}, y_{t_0}} \cdot \Delta y \quad (8)$$

In the sequential approach, however, the change is achieved in two steps: a change at a first time step and a second change at a subsequent time step, as seen in equation (9).

$$\Delta OBJ' = \frac{\partial f}{\partial x}\bigg|_{x_{t_0}, y_{t_0}} \cdot \Delta x + \frac{\partial f}{\partial y}\bigg|_{x_{t_1}, y_{t_1}} \cdot \Delta y \quad (9)$$

As a result, the two paradigms for identifying parameter changes based on an objective function may produce dramatically different results. As one example of the differences between the two paradigms, it can be seen that with the simultaneous update paradigm of equation (8), the system state at time $t_o$ is used to determine all updates. However, in the sequential updates paradigm of equation (9), there is a first update corresponding to x at time $t_o$. After a time increment necessary to implement this update and identify the new system state at time $t_1$, a second update may be processed corresponding to parameter y. The latter method leads to a slower and less efficient update scheme, with corresponding reduction in drilling performance. Exemplary operational differences resulting from the mathematical differences illustrated above include an ability to identify multiple operational changes simultaneously, to obtain optimized drilling conditions more quickly, to control around the optimized conditions more smoothly, etc.

As described in connection with FIG. 2, the present systems and methods begin by receiving or collecting data regarding drilling parameters, at least one of which is controllable. The present technology utilizes a local search engine to find optimal values for at least one controllable drilling parameter. Exemplary local search engines that may be utilized include PCA (principal component analysis), multi-variable correlation analysis methods and/or principle component analysis methods. These statistical methods, their variations, and their analogous statistical methods are well known and understood by those in the industry. Additional statistical means that may be used to identify a recommended parameter change include Kalman filtering, partial least squares (PLS, alternative term is partial latent structure), autoregressive moving average (ARMA) model, hypothesis testing, etc. In the interest of clarity in focusing on the inventive aspects of the present systems and methods, reference is made to the various textbooks and other references available for background and explanation of these statistical methods. While the underlying statistical methods and mathematics are well known, the manner in which they are implemented in the present systems and methods is believed to provide significant advantages over the conventional, single parameter, iterative methods described above. Accordingly, the manner of using these statistical models and incorporating the same into the present systems and methods will be described in more detail.

Figure 4:
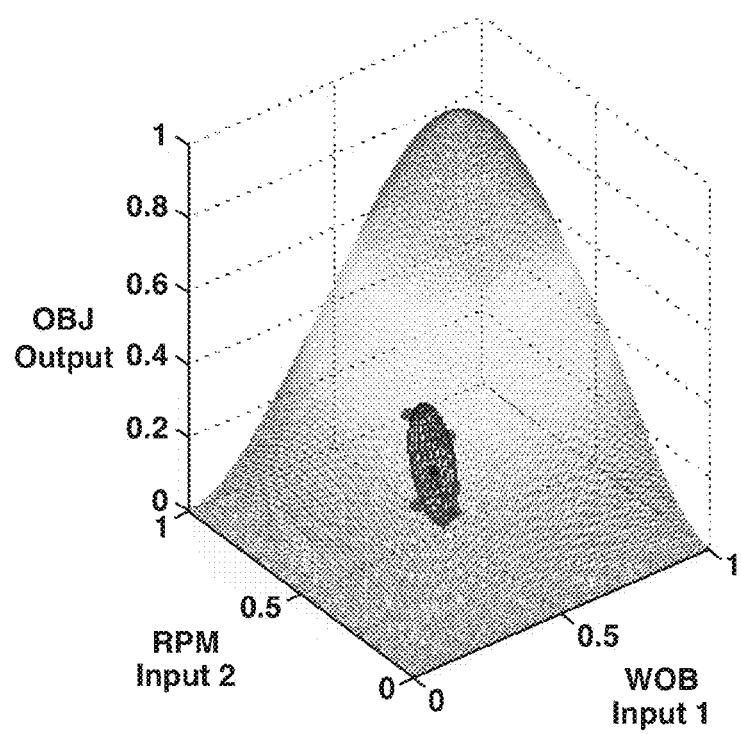
FIG. 4 illustrates the local search results moving along the gradient direction.
Figure 5:
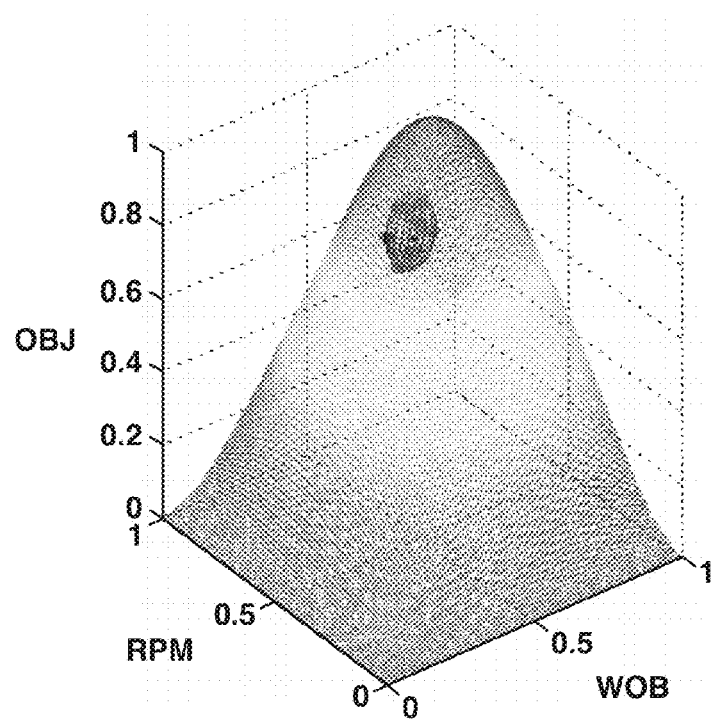
FIG. 5 illustrates the local search results close to the optimal point.

FIGS. 4 and 5 illustrate an example of searching the optimal point with a local search engine. Assume the objective function OBJ only depends on WOB and RPM, and there is only one peak within the operating ranges of WOB and RPM. Note that both RPM and WOB are normalized for illustration. Since the engine is based on local gradient, the recommended direction points along the gradient vector, and its step size is proportional to the slope. If the driller follows the recommendation, then the operating point, which is the cluster shown on the figures, moves towards the peak point. Since the step size is proportional to the slope, the step size will be close to zero when it reaches the peak point. In other words, the local search engine recommends staying at the optimal point when it gets there. In summary, (1) the local search engine can dynamically adjust the step size; (2) it is an iterative process and cannot find the optimal point in one step; (3) the effectiveness depends on the variations of the input data; (4) the searched results may be trapped at a local optimal point if the OBJ has multiple peaks. The previous patent publications WO2011016927 A1 and WO2011016928 A1 describe more details about the local search engine and the statistical method.

Global Search Methods

The global grid search engine assumes the objective function OBJ depends on the drilling controllable parameters (e.g., WOB, RPM, and flow rate) and finds the global optimal point from a windowed dataset. There may be two types of methods that can be used for the global search engines. One type is a response-surface based method, and the other is non-response-surface based method.

Figure 6:
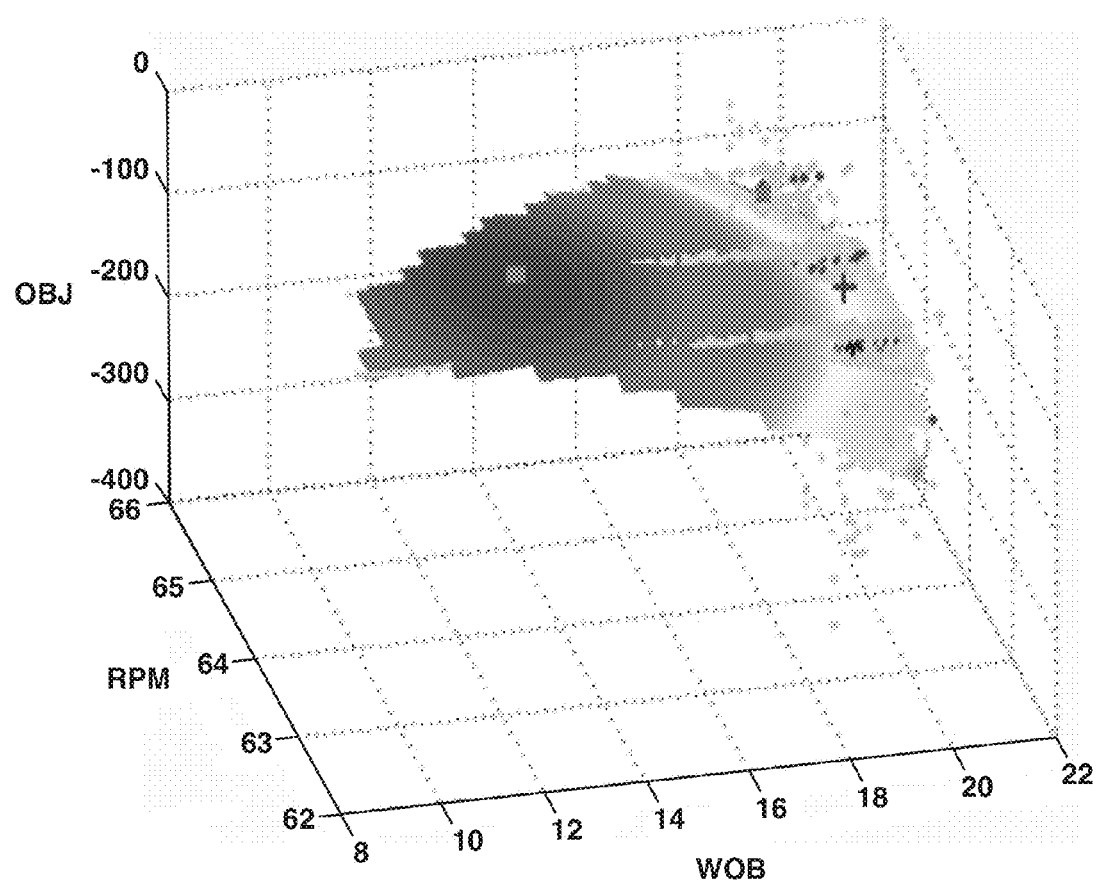
FIG. 6 illustrates the global search result with a constructed response surface from field data.

One of the embodiments of the response-surface based method includes the following steps: (1) collecting the real-time data into a moving window, (2) interpolating the response surface (the objective function as a function of at least two drilling controllable parameters) from the data, and (3) finding an optimal point from the response surface. The response surface may be constructed by a regression analysis method such as least squares regression, or any interpolation method including quadratic interpolation, higher order polynomial interpolation, Delaunary triangulation, etc. FIG. 6 shows one example of the response surface of negative MSE as a function of WOB and RPM via a quadratic regression method. For real-time implementation, an FIFO (First-In-First-Out) buffer can be used to collect live data, and the response surface can be updated for each time update. With the constructed surface, the optimal point can be found immediately. However, the effectiveness of the global engine also depends on the amount of variation of the input data.

The other type of global search engine does not require building the response surface. One of the embodiments is called "driller's method" which is similar to the traditional "drill-off test". The relevant parameters may be RPM and WOB, but without limitation other parameters may also be included such as mud pump rate, standpipe pressure, etc. In this exemplary method, the operating parameter space is provided by consideration of the maximum available WOB, the rig rotary speed limitations, minimum RPM for hole cleaning, as well as any other operational factors to be considered by the drilling organization, whether deemed as performance limitations, bit limitations, rig limitations, or any other factors. The maximum and minimum WOB and RPM are thus provided but could be subject to change for a subsequent drilling interval. The driller's method does not need any hyper-dimensional regression or interpolation method. However, it requires more interaction with the driller, and sometimes it is hard to drill at a fixed testing point during control drilling operation.

Figure 7:
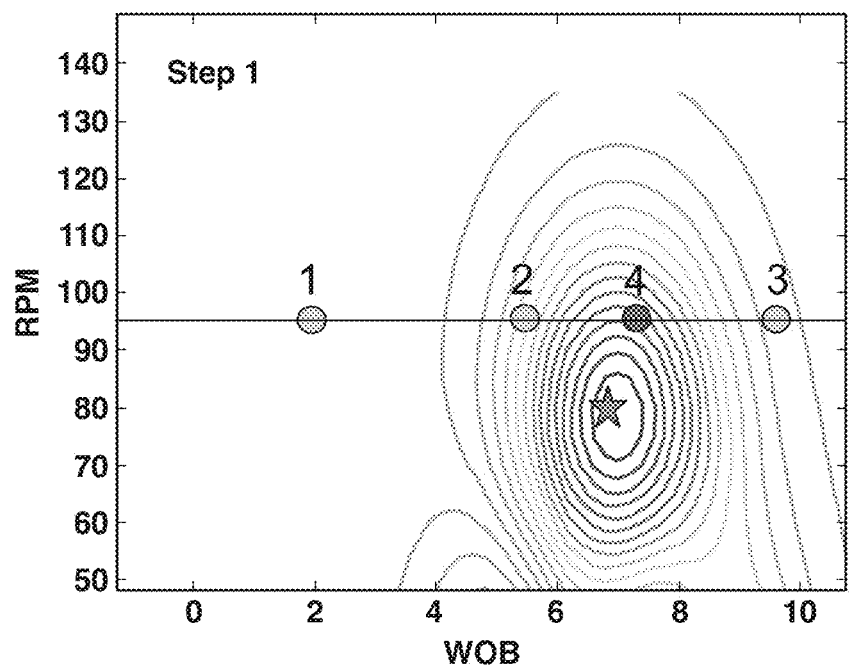
FIG. 7 illustrates the first step in a grid search using the Driller's Method, holding RPM constant and varying WOB.
Figure 8:
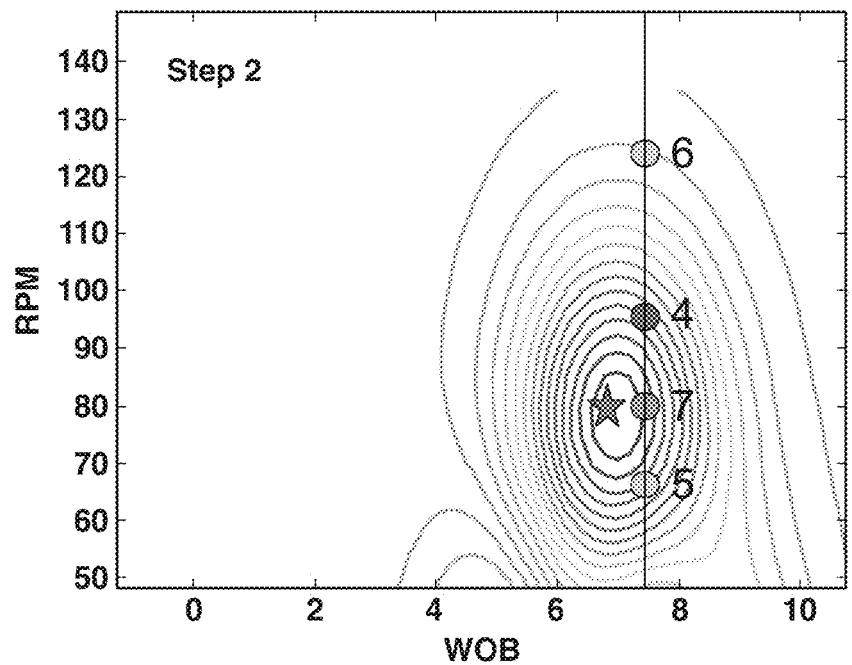
FIG. 8 illustrates the second step in a grid search using the Driller's Method, holding WOB constant and varying RPM.

FIGS. 7 and 8 illustrate how to implement the driller's method. In FIG. 7, Step 1 shows that the driller commences drilling with an operational parameter set 1. This operating condition is maintained just long enough to establish a consistent value for a selected objective function, such as those identified in Equations (1-5). For example, the MSE (Mechanical Specific Energy) may be a good selection for an objective function, which is shown by contour lines on FIGS. 7 and 8.

In Step 1 (FIG. 7), after sampling the drilling at parameter set 1 for an appropriate time interval (say 2, 3, 5, or 10 minutes, for example), the WOB may be increased at the same RPM to parameter set 2. After drilling a suitable amount of time at this condition, the WOB is then changed to parameter set 3. With drilling results and corresponding objective function values at three parameter sets, a polynomial curve fit, or some other function, may then be calculated. The optimum value of WOB, for fixed RPM, may then be calculated as parameter set 4. Alternative embodiments, with fewer or greater numbers of sample parameter sets, may also be chosen. Also, Step 1 may be chosen with fixed WOB and variable RPM, or alternatively, both may be varied simultaneously, requiring fitting the data to a two-dimensional surface. One embodiment of simultaneously alternating RPM and WOB values may be based on a Fractional Factorial test of Designs of Experiments (DOE). More generally, if there are N operating parameters to be optimized, the data may be fit to a surface of dimension up to N. Other implementations for processing a defined grid of operating parameter values may be conceived without departing from the scope of the invention.

Continuing with the Driller's Method, Step 2 as shown in FIG. 8 comprises holding the WOB at the value obtained for parameter set 4, which was found to be the optimal WOB at the initial value for RPM based on a curve fitting method. (In other embodiments, this step may not be required, and the optimal WOB may be used directly for different RPM values.) After drilling at parameter set 4 for some period of time, the RPM may be reduced for parameter set 5 and then increased for parameter set 6, for example. As before, with drilling results and corresponding objective function values at three parameter sets, a polynomial curve fit, or some other function, may then be calculated to identify the optimal RPM at this particular WOB. The parameter set 7 identified by the green dot is so obtained. In this example, the parameter set 7 is close to the theoretical optimal value identified by the red star in this chart.

There are many ways to conduct a global search. General methods for grid search are well known in the art, such as the Simplex, Golden Search, and Design of Experiments (DOE) methods. Several of these are provided in the reference, "Numerical Recipes in C," by W. H. Press et al.

Combined Methods

After obtaining results for global and local search engines, the next key step is to combine the recommendations from the two or more engines. One of the embodiments is to use a data fusion method to dynamically combine the search results from the two engines. "Data fusion" is a relatively new term used to describe a broad set of analytical methods. An exemplary reference is "An Introduction to Multisensor Data Fusion," by Hall and Llinas, Proceedings of the IEEE, Vol. 85, No. 1, January 1997.

Figure 9:
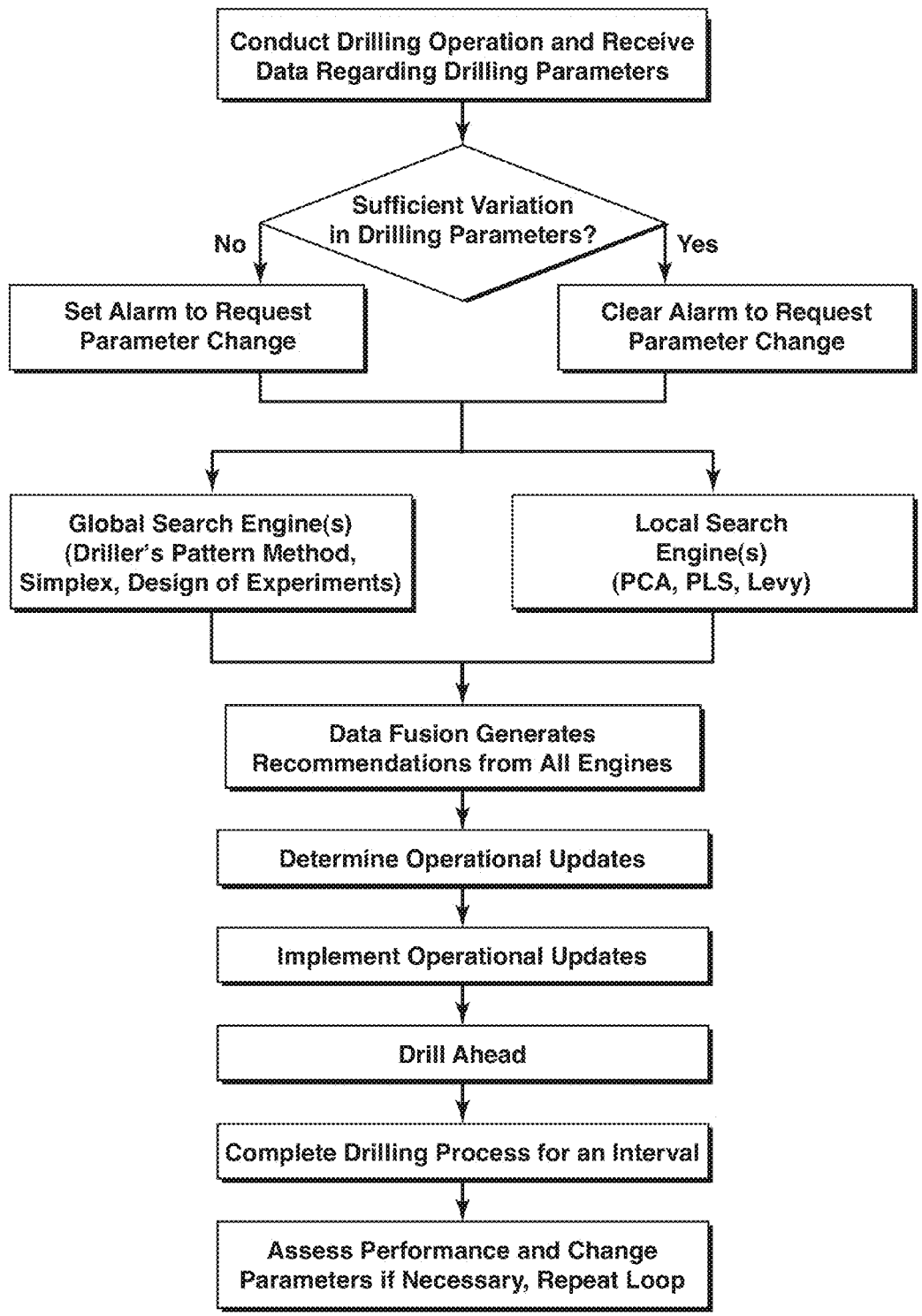
FIG. 9 is an exemplary flow chart of a drilling advisory system combining a local search engine and a global search engine for generating operation recommendations using a data fusion algorithm.

FIG. 9 is a flow diagram of the improved drilling advisory system (DAS) method. While drilling, the system is receiving data regarding the drilling parameters. A process is constantly checking the drilling parameters to determine if there is sufficient variation in the parameters for statistical validity. In one non-limiting approach, a count-down timer may be running on an ongoing basis. The timer starts to count down from the most recent change in parameters detected by the system. If no parameter is subsequently changed over a period of time (for example, 15 minutes) or depth, an alarm will be triggered and communicated to the driller via a visual indicator on the computer screen and/or an audio signal to remind the driller to change at least one drilling parameter. The timer is reset whenever a change is detected in one of the controllable parameters beyond some threshold amount. This step ensures that the drilling advisory system is fully utilized, because both global and local engines do not function well if there is no parameter change in the windowed dataset The local and global search engines may run in parallel and/or in serial mode. Key factors that contribute to selecting an engine include the history of knowledge of the drilling operations; detection of a significant change in the drilling process; specific time or depth trigger points; identification of a drilling dysfunction of the drilling process; an increase in a fundamental metric of the process, such as an increase in the MSE or a vibration score that may depend on an adjusted MSE value; or at the direction of the driller based on his or her specific knowledge of the drilling process and the present status of the operation. Statistical tests of the search results may also be used to assess statistical validity. If the tests are passed, then a recommendation mode displays the results of data fusion of global and local search results. If the tests are failed, then a learning mode is activated indicating that more data is needed for statistical validity. In this learning mode, the methods used for the global and local search as well as data fusion could be different from the application mode. One objective of the learning mode is to provide guidance on how to change parameters to obtain sufficient data to pass the tests of statistical validity. The driller should know that the suggested parameter value is based on a technical state of the advisory system process and not on the basis of experience drilling at this condition.

The count-down timer is a simple method to ensure sufficient variation in drilling parameters to achieve statistically significant results. Alternatively, the windowed dataset may be evaluated directly to determine if it is statistically significant. In general, to optimize a system dependent on N parameters, there must be a minimum of N+1 parameter sets within the data window to evaluate the process.

First, the combined method enables the driller to initiate the drilling optimization process by quickly scanning the operating parameter space. The data window is quickly filled with a variety of operating conditions, and the objective function map is coarsely sampled.

Second, when the objective function is subject to significant change, for example when the drill bit encounters a substantially different formation, the data window becomes stale and may be discarded. The grid search method then allows the data window to be refilled with drilling data observed in the new formation, and the statistics-based methods may be restarted. From a driller's perspective, the automated system no longer has relevant data, and the combined method recognizes this fact.

Third, every so often, to ensure that the objective function map has not changed significantly without detection, a global search engine can be quickly performed and the local search engine subsequently restarted or continued with fresh data from a broader set of operating parameters.

The two approaches work together to provide a system and associated methods that can be used under a wide variety of operating conditions. The global search provides some measure of protection against being stuck in a local optimum, since it is capable of spanning the entire operating parameter space. The local search engine is then well-suited to searching with smaller step sizes to optimize the objective function in a local sense.

In the event that there is a significant change in the objective function, or after a suitably long duration of time or depth without changes in drilling parameters, the grid search method may then be repeated, with the same or different trial operating parameter sets. It may be determined that the DAS data window should be flushed and restarted, but one option would be to continue to supplement the current data window with the new grid search results and any subsequent drilling data. These combined grid and statistics-based methods provide a robust drilling advisory system and methods. For change detection, various methods are available to identify a state change between different observation data sets, including statistical mean differences, clustering methods (K-means, minimax), edge detection methods (Gaussian filtering, Canny filtering, Hough Transform, etc.), STA/LTA (short-term average divided by long-term average), Kalman filtering, state observers, Bayesian Changepoint Detection (ref: Adams and MacKay), and other numerical techniques.

Illustrative, non-exclusive examples of systems and methods according to the present disclosure are presented in the following paragraphs. It is within the scope of the present disclosure that the individual steps of the methods recited herein, including in the following paragraphs, may additionally or alternatively be referred to as a "step for" performing the recited action.

In the first example, after 60 minutes of drilling, the global search engine produces optimization results of 10,000 pounds WOB and an RPM of 100. The local search engine produces optimization results of 14,000 pounds WOB and an RPM of 120. Statistical tests are passed, and a data fusion algorithm of averaging the global and local search engine results is invoked to produce operational recommendations of 12,000 pounds WOB and an RPM of 110.

The second example uses a least squares global regression of all the data in a 45 minute window, polynomial interpolation of the data in a local region of the window centered on the current drilling parameters, and PCA in the same local window. A statistical quality test checks for the number of data points in the local region of the window, and it is below the minimum for PCA. Data fusion is applied by averaging the results of the least squares global regression and local polynomial interpolation at the location of the respective optimum values of the objective function of depth of cut, DOC. At the optimum DOC of the response surface for the global regression, the WOB is 8,000 pounds and flow rate is 430 gallons per minute. For the local polynomial interpolation at the optimum DOC, the WOB is 6,000 pounds and flow rate is 470 gallons per minute. The data fusion of averaging the global and local results produces a WOB of 7,000 pounds and flow rate of 450 gallons per minute.

A third example of a data fusion method is a case in which a local search engine, say PCA, and a response-surface global search engine are operating on an MSE-based objective function. An additional search engine is calculating the potential for bit-balling to occur. The data fusion engine is calculating a weighted average of the PCA and response surface results, with weights determined by the value of the PCA regression coefficient. For the absolute value of a regression coefficient R, with values between 0 and 1, the weight applied to the PCA result is multiplied by R and the weight applied to the response surface result is (1-R). The data fusion algorithm provides this numerical value so long as the bit-balling criterion, based on the bit friction factor mu, does not fall below a critical threshold. When the criterion is met, the data fusion engine now provides recommendations to address the bit-balling problem, which in this case is to reduce WOB and increase RPM.

In some aspects, the improvements according to this disclosure and claims may include but are not limited to:

As set forth above, one method of drilling a wellbore through subterranean formation may comprise: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; using a data fusion method to determine a further optimized recommendation for the at least two controllable drilling parameters based upon the optimized results of the global and local search engines; determining operational updates to at least one of the at least two controllable drilling parameters based at least in part on the further optimized recommendation; and implementing at least one of the determined operational updates in the wellbore drilling operations.

The method according to any of the preceding paragraphs, wherein the drilling operational parameters include at least one of weight on bit (WOB), drillstring rotary speed, drillstring torque, rate of penetration (ROP), drilling fluid flow rate, stand pipe pressure, differential pressure across a mud motor, depth-of-cut (DOC), bit friction coefficient mu, and mechanical specific energy (MSE).

The method according to any of the preceding paragraphs, wherein the at least two controllable drilling parameter values include WOB, RPM, drilling fluid flow rate, and pump stroke rate.

The method according to any of the preceding paragraphs, wherein the received data is temporarily accumulated in a moving memory window, and wherein the global and local search engines use data from at least a portion of the moving memory window.

The method according to any of the preceding paragraphs, wherein the moving memory window accumulates data in an interval based on at least one of time and depth; and wherein the length of the window is determined by the frequency of changing the controllable drilling parameters and lithology changes.

The method according to any of the preceding paragraphs, wherein the global search engines are based on a grid search method comprising at least one of: 9-point, simplex, golden search, and design of experiments (DOE) methods.

The method of Claim 6, wherein the grid search method comprises: (1) calculating an objective function from recorded data related to the at least two drilling operational parameters; (2) constructing a response surface by regression or interpolation methods from the objective function values, using at least one of least squares regression, quadratic interpolation or Delaunay triangulation; (3) finding an optimum value for the objective function from the response surface; (4) determining the optimized controllable drilling parameter values associated with the optimum value of the response surface.

The method according to any of the preceding paragraphs, wherein the objective function is based on at least one of: rate of penetration (ROP), depth of cut (DOC), mechanical specific energy (MSE), weight on bit (WOB), drillstring rotation rate, bit coefficient of friction (mu), bit rotation rate, torque applied to the drillstring, torque applied to the bit, vibration measurements, hydraulic horsepower, and mathematical combinations thereof.

The method according to any of the preceding paragraphs, wherein the local search engines are based on principal component analysis (PCA), Powell's method, gradient search, or other search methods.

The method according to any of the preceding paragraphs, wherein the step of determining a further optimized recommendation from using the data fusion is based on at least one of statistical quality metrics, correlation values, and minimum number of data points in a data window.

The method according to any of the preceding paragraphs, wherein the data fusion is based on a method that includes at least one of: averaging, weighted averaging, power-law averaging, Murphy's averaging, fuzzy logic, Dempster-Shafer (D-S) Evidence, Kalman filter, and Bayesian networks.

The method according to any of the preceding paragraphs, wherein the data fusion creates operational recommendations by selecting an optimized value from either a global or a local search engine.

The method according to any of the preceding paragraphs, further comprising conducting at least one hydrocarbon production-related operation in the wellbore; wherein the at least one hydrocarbon production-related operation is selected from the group comprising: well completion operations; injection operations, treatment operations, and production operations.

The method according to any of the preceding paragraphs, wherein at least one of the determined operational recommendations is implemented in the drilling operation substantially automatically.

The method according to any of the preceding paragraphs, further comprising a count-down timer for changing at least one of the controllable drilling parameters.

A computer-based system for use in association with drilling operations, the computer-based system comprising: a processor adapted to execute a programmed set of instructions; a storage medium in communication with the processor; and at least one instruction set accessible by the processor and saved in the storage medium, wherein the at least one instruction set is adapted for: receiving data regarding drilling parameters characterizing ongoing wellbore drilling operations; wherein at least one of the drilling parameters is controllable; utilizing global search engines and/or local search engines to find the optimized values; using a data fusion method to generate recommendations for operational parameters from both global and local search engines; determining operational updates to at least one controllable drilling parameter based at least in part on the generated operational recommendations; and exporting the generated operational updates for ongoing drilling operations; and implementing at least one of the determined operational updates in the drilling operations.

The computer-based system of the preceding paragraph, wherein the generated operational updates are exported to a control system adapted to implement substantially automatically at least one of the operational recommendations during the drilling operation.

The computer-based system of any preceding paragraph, wherein the generated operational updates are exported to a network such that the operational updates may be read from other computers.

The systems and methods described herein are applicable to the oil and gas industry, especially within the wellbore drilling industry thereof.

In the present disclosure, several of the illustrative, non-exclusive examples of methods have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities, other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following claims.

What is claimed is:

1. A method of drilling a wellbore through subterranean formation, the method comprising:
   (a) receiving data regarding at least two drilling operational parameters related to wellbore drilling operations into an operating parameter database;
   (b) computing a mathematical objective function based upon the received data for input into each of a global search engine and a local search engine;
   (c) inputting the computed objective function and received data into the global search engine to create a global response surface, and to identify at least two global-engine recommended drilling parameters;
   (d) inputting the computed objective function and received data into the local search engine to determine a significantly correlated drilling parameter, and to identify at least two local-engine recommended drilling parameters based upon the significantly correlated controllable drilling parameter;
   (e) creating a combined dataset using a data fusion process by combining (i) the created global response surface, and (ii) the determined significantly correlated controllable drilling parameter and the local-engine recommended drilling parameters;
   (f) using a decision tree process on the data fusion combined dataset to determine whether to define a status mode of the combined dataset as at least one of a learning mode and an application mode;
   determining operational updates to at least one of the at least two controllable drilling parameters based at least in part on the further optimized recommendation; and
   implementing at least one of the determined operational updates in the wellbore drilling operations.

2. The method of claim 1, wherein the drilling operational parameters include at least one of weight on bit (WOB), drillstring rotary speed, drillstring torque, rate of penetration (ROP), drilling fluid flow rate, stand pipe pressure, differential pressure across a mud motor, depth-of-cut (DOC), bit friction coefficient mu, and mechanical specific energy (MSE).

3. The method of claim 1, wherein using the decision tree process on the data fusion combined dataset to determine whether to define the status mode of the combined dataset as at least one of the learning mode and the application mode further comprises the steps of:
   determining whether an acceptable variation in drilling operational parameters exists within the global search engine response surface;
   determining whether the drilling operations are occurring in the same formation as other data within the operating parameter database; and
   determining whether the drilling operations are experiencing a drilling dysfunction.

4. The method of claim 1, wherein the received data is temporarily accumulated in a moving memory window as the operating parameter database, and wherein the global and local search engines use data from at least a portion of the moving memory window.

5. The method of claim 4, wherein the moving memory window accumulates data in an interval based on at least one of time and depth; and wherein the length of the window is determined by a frequency of changing the controllable drilling parameters and by a lithology change.

6. The method of claim 1, wherein the global search engine is based on a grid search method comprising at least one of: 9-point, simplex, golden search, and design of experiments (DOE) methods.

7. The method of claim 1, wherein the global search engine is based on a grid search method comprising: (1) calculating an objective function from recorded data related to the at least two drilling operational parameters; (2) constructing a response surface by regression or interpolation methods from the objective function values, using at least one of least squares regression, quadratic interpolation or Delaunay triangulation; (3) finding an optimum value for the objective function from the response surface; and (4) determining the optimized controllable drilling parameter values associated with the optimum value of the response surface.

8. The method of claim 7, wherein the objective function is based on at least one of: rate of penetration (ROP), depth of cut (DOC), mechanical specific energy (MSE), weight on bit (WOB), drillstring rotation rate, bit coefficient of friction (mu), bit rotation rate, torque applied to the drillstring, torque applied to the bit, vibration measurements, hydraulic horsepower, and mathematical combinations thereof.

9. The method of claim 1, wherein the local search engine is based on at least one of principal component analysis (PCA), Powell's method, and gradient search.

10. The method of claim 1, wherein a decision tree based on statistical quality metrics is used to select from the application status mode and the learning status mode.

11. The method of claim 1, wherein a decision tree based on at least one drilling dysfunction map is used to select from the application status mode and the learning status.

12. The method of claim 1, wherein a decision tree based on a combination of statistical quality metrics and at least one drilling dysfunction map is used to select from the application status mode and the learning status mode to generate operational recommendations.

13. The method of claim 1, wherein the decision tree determines to define the status mode of the combined dataset as learning mode status and empties the data window, continues to receive drilling parameter data, recommends controllable drilling parameter values to a driller, and calculates a statistical quality metric of the received data.

14. The method of claim 1, wherein at least one of the determined operational recommendations is implemented in the drilling operation substantially automatically.

15. The method of claim 1, further comprising:
selecting one of;
(a) wherein if the decision tree status mode determination of step (f) is learning mode, then:
  a. providing an additional data input for each of the at least two drilling operational parameters in the operating parameter database and repeating steps (b)-(f) for the additional data input for expanding the created global response surface and for revising the global-engine recommended drilling parameters; and
  b. recommending use of the global-engine recommended drilling parameters for making an implementable drilling operational decision; and (b) wherein if the decision tree status mode selection of step (f) is application mode, then comparing the global-engine recommended drilling parameters with the local-engine recommended drilling parameters;
  a. wherein if the compared global-engine recommended drilling parameters and the local-engine recommended drilling parameters are determined to be correlated within a predefined range of agreement with each other, instructing to use either of the global-engine recommended or local-engine recommended set of correlated drilling parameters for use regarding drilling operations; and
  b. wherein if the two sets are determined not within a predefined range of agreement with each other, re-perform the local search engine on the global-engine recommended drilling parameters to identify updated local-engine recommended drilling parameters, and instructing to use the local-engine recommended set of correlated drilling parameters for use regarding drilling operations.

16. A computer-based system for use in association with drilling operations, the computer-based system comprising:
a processor adapted to execute a programmed set of instructions;
a storage medium in communication with the processor; and
at least one instruction set accessible by the processor and saved in the storage medium, wherein the at least one instruction set is adapted for:
(a) receiving data regarding at least two drilling operational parameters related to wellbore drilling operations into an operating parameter database;
(b) computing a mathematical objective function based upon the received data for input into each of a global search engine and a local search engine;
(c) inputting the computed objective function and received data into the global search engine to create a global response surface, and to identify global-engine recommended drilling parameters;
(d) inputting the computed objective function and received data into the determine a significantly correlated drilling parameter, and to identify a local-engine recommended drilling parameters based upon the significantly correlated drilling parameter;
(e) creating a combined dataset using a data fusion process by combining (i) the created global response surface, and (ii) the determined significantly correlated drilling parameter and the local-engine recommended drilling parameters;
(f) using a decision tree process on the data fusion combined dataset to generate operational updates to the at least two drilling operational parameters; and
implementing at least one of the generated operational updates in the drilling operations.

17. The computer-based system of claim 16, wherein the generated operational updates are exported to a control system adapted to implement substantially automatically at least one of the operational recommendations during the drilling operation.

18. The computer-based system of claim 16, wherein the generated operational updates are exported to a network such that the operational updates may be read from other computers.

* * * * *